(12) United States Patent
Scioscia et al.

(10) Patent No.: US 10,047,240 B2
(45) Date of Patent: Aug. 14, 2018

(54) COMPOSITIONS FOR TREATING TEXTILE MATERIALS

(71) Applicant: Jean Alexander Cosmetics, Inc., McKees Rocks, PA (US)

(72) Inventors: Joseph Scioscia, Bellevue, PA (US); Raymond R. Riso, Upper St. Clair, PA (US)

(73) Assignee: JEAN ALEXANDER COSMETICS, INC., McKees Rocks, PA (US)

( * ) Notice: Subject to any disclaimer, the term of this patent is extended or adjusted under 35 U.S.C. 154(b) by 761 days.

(21) Appl. No.: 14/151,132

(22) Filed: Jan. 9, 2014

(65) Prior Publication Data

US 2015/0191618 A1 Jul. 9, 2015

(51) Int. Cl.

| | | |
|---|---|---|
| *C09D 123/06* | (2006.01) |
| *D06M 15/227* | (2006.01) |
| *D06M 13/148* | (2006.01) |
| *D06M 13/342* | (2006.01) |
| *D06M 13/368* | (2006.01) |
| *D06M 13/372* | (2006.01) |
| *D06M 13/402* | (2006.01) |
| *D06M 15/15* | (2006.01) |
| *D06M 16/00* | (2006.01) |
| *D06M 101/34* | (2006.01) |

(52) U.S. Cl.

CPC ......... *C09D 123/06* (2013.01); *D06M 13/148* (2013.01); *D06M 13/342* (2013.01); *D06M 13/368* (2013.01); *D06M 13/372* (2013.01); *D06M 13/402* (2013.01); *D06M 15/15* (2013.01); *D06M 15/227* (2013.01); *D06M 16/00* (2013.01); *D06M 2101/34* (2013.01); *D06M 2200/25* (2013.01); *Y10T 442/2893* (2015.04)

(58) Field of Classification Search
None
See application file for complete search history.

(56) References Cited

U.S. PATENT DOCUMENTS

| | | |
|---|---|---|
| 3,520,842 A | 7/1970 | Crean |
| 3,784,497 A | 1/1974 | Berliner |
| 4,970,110 A | 11/1990 | Miraldi |
| 5,066,521 A | 11/1991 | Morsy |
| 5,346,725 A | 9/1994 | Targosz |
| 2004/0224863 A1 | 11/2004 | Sun et al. |
| 2004/0242706 A1 | 12/2004 | Wiersema et al. |
| 2009/0178212 A1 | 7/2009 | Wahl et al. |
| 2013/0296082 A1* | 11/2013 | Gonzalez ............... A63B 59/02 473/513 |

* cited by examiner

*Primary Examiner* — Shawn Mckinnon

(74) *Attorney, Agent, or Firm* — The Webb Law Firm

(57) ABSTRACT

A composition for treating textile materials includes water, polyethylene, surfactant, preservative, and a mixture comprising sugar alcohol, hydrolyzed animal protein, and sarcosine compound. The composition can further include a fragrance. A textile material treated with the compositions described above can be a material selected from leather, nylon, or a mixture thereof. A method of preparing a composition for treating a textile material is also disclosed.

20 Claims, No Drawings

US 10,047,240 B2

COMPOSITIONS FOR TREATING TEXTILE MATERIALS

BACKGROUND OF THE INVENTION

Field of the Invention

The present invention relates to compositions for treating a textile, methods of preparing such compositions, and textiles treated with such compositions.

Description of Related Art

Textiles such as nylon, leather, and the like must be treated to withstand moisture, sunlight, and other external conditions. For instance, strands of nylon material can be used to form sporting equipment such as the pocket of lacrosse sticks. As a result, the nylon material is subjected to moisture and other external conditions. If left untreated, the nylon material will become brittle, shrink, and/or tear. As such, nylon and other textile materials must be treated or coated to prevent deterioration.

Products currently applied to textile materials are messy, require a labor intensive process, and/or require constant application. These products are also incapable of both strengthening and permanently enhancing the elasticity of textile materials. For example, in the specific case regarding the pocket of a lacrosse stick, a new pocket must be broken in to have the right depth and shape. However, current products used to treat lacrosse pockets require a labor intensive process that can take hours. Further, lacrosse pockets are frequently replaced or "re-strung" using a new piece of nylon textile. Currently there is no product to treat the new textile material—to soften, strengthen, and elasticize it—to facilitate the stringing process. Thus, current textile conditioning products, such as those used for treating pockets of lacrosse sticks, have various drawbacks.

A need, therefore, exists for compositions that can be used to treat textile materials that overcome the various drawbacks of current textile treatment products.

SUMMARY OF THE INVENTION

In accordance with one embodiment of the present invention, a composition for treating a textile material comprises water, polyethylene, at least one surfactant, at least one preservative, and a mixture comprising at least one sugar alcohol, at least one hydrolyzed animal protein, and at least one sarcosine compound. The composition can further comprise at least one fragrance. The composition can have a pH of 7.0 or greater. In certain embodiments, a textile material treated with the compositions described above can be a material selected from leather, nylon, or a mixture thereof.

In accordance with certain embodiments of the present invention, a method of preparing a composition for treating textile materials is provided, the method comprising: mixing water; at least one surfactant; at least one preservative; and a mixture comprising a sugar alcohol, a hydrolyzed animal protein, and a sarcosine derivative to form a solution; adjusting the pH of the solution to a pH of 7.0 or greater; and adding polyethylene to the solution. The method can further include adding at least one fragrance to the solution and filtering the solution. The temperature of the solution during preparation of the composition for treating a substrate can be from 15° C. to 40° C.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" surfactant, "a" preservative, "a" fragrance, "a" sugar alcohol, "a" hydrolyzed animal protein, "a" sarcosine derivative, and the like refer to one or more of any of these items.

In certain embodiments, the present invention is directed to a waterborne composition. As used herein, the term "waterborne" refers to compositions that comprise more than 50 weight % water, based on the total weight of the composition. In certain embodiments, the compositions of the present invention comprise more than 55 weight % water or more than 60 weight % of water, based on the total weight of the composition. In some of these embodiments, the compositions comprise from 50 to 99 weight % water, or 50 to 90 weight % water, or 60 to 70 weight % water, based on the total weight of the composition.

In certain embodiments, the compositions comprise at least one surfactant. As used herein, a "surfactant" refers to molecules containing a polar portion that thermodynamically prefer to be solvated by a polar solvent, and a hydrocarbon portion that thermodynamically prefer to be solvated by a non-polar solvent. The term "surfactant" also encompasses anionic, cationic, or non-ionic surfactants. As used herein, the term "anionic surfactant" refers to a surfactant with a polar portion that ionizes to form an anion in aqueous solution. Similarly, a "cationic surfactant" refers to a surfactant having a cationic polar portion that ionizes to form a cation in aqueous solution. A "non-ionic" surfactant refers to a surfactant having a polar portion that does not ionize in aqueous solution.

The compositions of the present invention can include one or more surfactants. For instance, in certain embodiments, the compositions of the present invention can include two or more surfactants. When the compositions include two or more surfactants, the surfactants can be anionic surfactants, cationic surfactants, non-ionic surfactants, or a combination thereof. In one embodiment, a composition for treating textile materials, according to the present invention, includes both a cationic surfactant and an anionic surfactant.

Non-limiting examples of suitable surfactants include sulfosuccinate salts such as sodium dioctyl sulfosuccinate, disodium lauryl sulfosuccinate, sodium lauryl sulfosuccinate, and sodium lauryl sulfoacetate. Other non-limiting examples of suitable surfactants include quaternary ammonium salts such as cetrimonium chloride, for example. In certain embodiments, the surfactant comprises a combination of disodium lauryl sulfosuccinate and cetrimonium chloride. Surfactants suitable for use with the compositions of the present invention are commercially available from Mona Industries Inc. under the trade name MONAMATE™ LA-100 (disodium lauryl sulfosuccinate), and from Stepan Company under the trade name AMMONYX® CETAC (cetrimonium chloride).

In certain embodiments, the surfactants comprise from 0.5 to 10 weight % of the composition based on the total weight of the composition. In some of these embodiments, the surfactants comprise from 1 to 9 weight % of the composition, such as from 3 to 8 weight % of the composition, based on the total weight of the composition. In one embodiment, the compositions of the present invention comprise from 0.1 to 4 weight % of disodium lauryl sulfosuccinate and from 2 to 8 weight % of cetrimonium chloride.

As indicated, the compositions of the present invention can also comprise a preservative. As used herein, the term "preservative" refers to a compound or mixture of compounds that inhibits microbial growth and/or reduces microbe populations in a composition. The compositions of the present invention can include more than one preservative. For instance, in certain embodiments, the compositions of the present invention include two or more preservatives.

Non-limiting examples of suitable preservatives include: isothiazolinones such as methylchloroisothiazolinone and methylisothiazolinone; imidazolidinedione compounds such as 1,3-Bis(hydroxymethyl)-5,5-dimethylimidazolidine-2,4-dione (also known as DMDM hydantoin); iodopropynyl butylcarbamate; and mixtures thereof. In one embodiment, the compositions of the present invention include a combination of a methylchloroisothiazolinone/methylisothiazolinone mixture and 3-Bis(hydroxymethyl)-5,5-dimethylimidazolidine-2,4-dione/iodopropynyl butylcarbamate mixture. Preservatives that can be used with the compositions of the present invention are commercially available from Dow Chemical under the trade name KATHON™ CG (methylchloroisothiazolinone/methylisothiazolinone), and from Lonza under the trade name GLYDANT® PLUS (1,3 -Bis(hydroxymethyl)-5,5-dimethylimidazolidine-2,4-dione/iodopropynyl butylcarbamate).

In certain embodiments, the preservatives comprise from 0.01 to 3 weight % of the composition based on the total weight of the composition. In some of these embodiments, the surfactants comprise from 0.05 to 2 weight % of the composition, such as from 0.1 to 1 weight % of the composition, based on the total weight of the composition. In one embodiment, the compositions of the present invention comprise from 0.05 to 1 weight % of a methylchloroisothiazolinone/methylisothiazolinone mixture and from 0.05 to 1 weight % of a 1,3-Bis(hydroxymethyl)-5,5-dimethylimidazolidine-2,4-dione/iodopropynyl butylcarbamate mixture.

In certain embodiments, the compositions of the present invention comprise a mixture comprising at least one sugar alcohol, at least one hydrolyzed animal protein, and/or at least one sarcosine compound. The mixture can be a preformed mixture. As used herein, a "preformed mixture" refers to a mixture that is prepared before it is incorporated into the compositions of the present invention. Further, as used herein, a "sugar alcohol" refers to polyhydric alcohols derived from carbohydrates. Non-limiting examples of sugar alcohols include C4 to C6 sugar alcohols such as mannitol, sorbitol, xylitol, ribitol, arabitol, erythritol, and threitol. Preferably, C6 sugar alcohols, such as sorbitol are used. In certain embodiments, the sugar alcohol comprises from 30 to 70 weight %, or from 40 to 60 weight %, or from 45 to 55 weight % of the mixture.

As indicated, the preformed mixture also can comprise one or more hydrolyzed animal proteins. A "protein" refers to a peptide chain having at least two amino acid residues, and a "hydrolyzed animal protein" refers to a protein derived from an animal that has been hydrolyzed or broken down into its component amino acids. Non-limiting examples of suitable hydrolyzed animal proteins include potassium cocohydrolyzed animal protein, TEA-coco-hydrolyzed animal protein, TEA-abietoyl hydrolyzed animal protein, potassium undecylenoyl hydrolyzed animal protein, and mixtures thereof. In certain embodiments, the hydrolyzed animal protein comprises from 20 to 50 weight %, or from 25 to 45 weight %, or from 30 to 40 weight % of the mixture.

As described above, the mixture can also comprise at least one sarcosine compound. As used herein, a "sarcosine compound" refers to a derivative of the compound sarcosine. Non-limiting examples of sarcosine compounds that can be used include n-acyl sarcosines such as lauroyl sarcosine, cocoyl sarcosine, myristoyl sarcosine, oleoyl sarcosine, and stearoyl sarcosine. In certain embodiments, the sarcosine compound comprises from 1 to 20 weight %, or from 5 to 15 weight %, or from 8 to 12 weight % of the mixture.

During preparation of the mixture, sugar alcohol(s), hydrolyzed animal protein(s), and sarcosine compound(s) can be mixed together for a period of time, such as stirred using a conventional stirrer for about 1 to 10 minutes. A pH buffer can be added to adjust the pH of the mixture. Non-limiting examples of pH buffers that can be used include triethanolamine, ammonia, diethanolamine, monoethanolamine, potassium hydroxide, sodium hydroxide, and mixtures thereof. In certain embodiments, the preformed mixture is adjusted to a pH of 6.0 or greater. In some of these embodiments, the pH of the preformed mixture is adjusted to a pH between 6.0 and 8.0, such as from 6.5 to 7.5.

After the mixture is prepared, it can be used to form the compositions for treating textiles described herein. In certain embodiments, the preformed mixture comprises from 1 to 20 weight %, or from 5 to 15 weight %, or from 8 to 12 weight % of the composition, based on the total weight of the composition.

As indicated, in certain embodiments, the compositions of the present invention can also comprise polyethylene such as polyethylene glycols, for example. In certain embodiments, the compositions include Polyethylene 40A, a dispersion of ethylene polymer, commercially available from BYK. In certain embodiments, the polyethylene component comprises from 10 to 30 weight %, or from 15 to 25 weight %, or from 18 to 22 weight % of the composition, based on the total weight of the composition.

One or more additional components also can be used to form the compositions for treating textiles according to the present invention. For example, a fragrance can also be used to form the compositions. As used herein, a "fragrance" refers to a compound, which is used alone or in combination with other compounds, to elicit an olfactory response in humans. In certain embodiments, the fragrance comprises an aromatic compound containing natural essential oils that can include spices, patchouli, and citrus, for example. The fragrance also can contain isolates from natural oils and sweet aromatic powders. In certain embodiments, the fragrance comprises from 0.01 to 4 weight %, or from 0.05 to 2 weight %, or from 0.1 to 1 weight % of the composition.

As indicated above, the present invention also is directed to a method of preparing the compositions for treating textiles. In certain embodiments, the method includes mixing water, surfactant(s), preservative(s), and a preformed mixture comprising sugar alcohol(s), hydrolyzed animal protein(s), and sarcosine compound(s) to form a solution. The types and amounts of each of these components include those described in detail above. After forming the solution, a pH buffer can be used to adjust the pH of the solution. A non-limiting example of a pH buffer that can be used to adjust the pH of the solution includes caustic soda. In certain embodiments, the pH of the solution is adjusted to a pH of 6.5 or greater. In some of these embodiments, the pH of the solution is adjusted to a pH between 6.5 and 8.5, such as a pH of 7.5.

In certain embodiments, after adjusting the pH of the solution, polyethylene is added to the solution under continuous agitation and mixed for a period of time, for example about 15 to about 25 minutes. In one embodiment, a fragrance is also added and mixed into the solution along with polyethylene. The amounts of polyethylene and fragrance added to the solution include any of the amounts described above for each of these components, respectively. In certain embodiments, the solution is filtered after mixing polyethylene, and optionally the fragrance, into the solution. Further, in certain embodiments, the temperature of the solutions during preparation of the compositions can be maintained at a range from 15° C. to 40° C.

The compositions described herein can be used to treat and condition textile materials. As used herein, the term "textile materials" refers to both unprocessed and processed fibers, strands, yarns, woven or knit fabrics, non-woven fabrics, garments, and the like. Non-limiting examples of textile materials that can be treated with the compositions of the present invention include leather, nylon, polyesters, and the like. Such materials are used to produce various objects which can be softened and/or conditioned with the compositions described herein. For instance, the compositions described herein can be used to soften and/or condition nylon field belts and equipment belts and duty belts used by military, law enforcement, and public safety members. The compositions can also be used to soften and/or condition products used in sporting industries such as for lacrosse pockets, hunting and scuba diving equipment, for example. Other non-limiting nylon objects that can be softened and/or conditioned with the compositions of the present invention include nylon bull whips, nylon farm and ranch ropes for horses and cattle, nylon boating lines, and nylon halters for horses.

The compositions of the present invention can be applied to textile materials using various methods. In certain embodiments, the compositions are sprayed onto all sides of the textile materials that need to be treated and/or conditioned. The compositions can be sprayed so that the textile materials are saturated with the compositions. In certain embodiments, the compositions can be massaged in some or all areas of the textile material. It was surprisingly found that textile materials instantly become soft and pliable after applying the compositions described herein. Thus, the compositions of the present invention can be used to instantly treat a variety of textile materials.

The following examples are presented to demonstrate the general principles of the invention. The invention should not be considered as limited to the specific examples presented. All parts and percentages in the examples are by weight unless otherwise indicated.

EXAMPLE 1

Preparation of Preformed Mixture Containing a Sugar Alcohol

A Vari-Mix mixer from Lightnin was attached to a 125 gallon stainless steel kettle made by Lee Industries. The mixer was turned on and the following ingredients shown in Table 1 were added to the kettle.

TABLE 1

| Ingredient | Amount |
| --- | --- |
| Sorbitol[1] | 50.0 lbs. |
| TEA-coco-hydrolyzed animal protein | 35.0 lbs. |
| Cocoyl sarcosine | 10.0 lbs. |
| Triethanolamine[2] | 5.0 lbs. |

[1] 70% sorbitol was used.
[2] 99% triethanolamine was used.

The sorbitol, TEA-coco-hydrolyzed animal protein, and cocoyl sarcosine shown in Table 1 were first added to the kettle and blended together. Triethanolamine was then added to the vessel in accordance with Table 1 to raise the pH of the mixture to a pH of 6.5. The pH was measured using a standard pH meter by Orion.

EXAMPLE 2

Preparation of a Textile Treatment Composition

A Vari-Mix mixer from Lightnin was attached to a 125 gallon stainless steel kettle made by Lee Industries. Then, 30 gallons of water were first added to the kettle and the mixer was turned on. The water was heated to 15° C. using a steam boiler by Industrial Boiler Co. Inc. The ingredients listed in Table 2 below were then added and mixed into the kettle containing the water.

TABLE 2

| Ingredient | Amount |
| --- | --- |
| MONAMATE ™ LA-100[1] | 4.0 lbs. |
| AMMONYX[(R)] CETAC [2] | 20.0 lbs. |
| Mixture of Example 1 | 40.0 lbs. |
| KATHON ™ CG[3] | 7.0 oz. |
| GLYDANT[(R)] PLUS [4] | 14.0 oz. |

[1] Disodium lauryl sulfosuccinate, commercially available from Mona Industries Inc.
[2] Centrimonium chloride, commercially available from Stepan Company.
[3] Methylchloroisothiazolinone/methylisothiazolinone mixture, commercially available from Dow Chemical.
[4] 1,3-Bis(hydroxymethyl)-5,5-dimethylimidazolidine-2,4-dione/iodopropynyl butylcarbamate mixture, commercially available from Lonza.

As shown in Table 2 above, 4 lbs. of MONAMATE™ LA-100 were added to the kettle containing the water. The water and MONAMATE™ LA-100 were mixed together without forming a vortex. Next, 20 lbs. of AMMONYX® CETAC, 40 lbs. of the mixture of Example 1, 7 oz. of KATHON™ CG, and 14 oz. of GLYDANT® PLUS were added to the kettle separately as listed and mixed accordingly. The ingredients were mixed without forming a vortex. After mixing, the solution was covered with plastic wrap and allowed to sit until the solution was translucent with an amber color. The mixer was then turned on to mix the solution. Then, 3 oz. of a 50% caustic soda solution was added and mixed into the solution to raise the pH of the solution to 7.5. After adjusting the pH of the solution, 80 lbs. of polyethylene 40A available from BYK and 13 oz. of fragrance available from Belle-Aire Fragrances were added under continuing agitation. The temperature of the solution was held between 15° C. and 40° C. during the addition of polyethylene and fragrance.

EXAMPLE 3

Treatment of a Nylon Lacrosse Pocket

The composition prepared in Example 2 was sprayed at room temperature (25° C.) onto both sides of a nylon pocket of a lacrosse stick. The composition was sprayed such that the desired portions of the nylon pocket were sufficiently saturated. Upon applying the composition, the nylon pocket instantly became soft and pliable. A lacrosse ball was then placed into the pocket to form the desired shape and depth of the pocket. The lacrosse ball was kept in the lacrosse pocket until the pocket was dry to the touch. After removing the lacrosse ball, the lacrosse pocket was rinsed with water and allowed to dry. The conditioned nylon pocket was soft and pliable having the desired shape and depth for a lacrosse ball. The application to soften and condition the nylon lacrosse pocket was fast and did not require intensive clean up as with other commercial products. In addition, conditioning the nylon material was easy and did not require multiple treatments.

Whereas particular embodiments of this invention have been described above for purposes of illustration, it will be evident to those skilled in the art that numerous variations of the details of the present invention may be made without departing from the invention as defined in the appended claims.

The invention claimed is:

1. A composition for treating textile materials consisting of:
    water;
    polyethylene;
    a surfactant selected from the group consisting of disodium lauryl sulfosuccinate, cetrimonium chloride, and a mixture of disodium lauryl sulfosuccinate and cetrimonium chloride;
    at least one preservative;
    a preformed mixture comprising at least one sugar alcohol, at least one hydrolyzed animal protein, and at least one sarcosine compound; and
    optionally, a fragrance; and
    optionally, a component for adjusting pH.

2. The composition of claim 1, wherein the preservative is selected from the group consisting of methylchloroisothiazolinone, methylisothiazolinone, 1,3-Bis(hydroxymethyl)-5,5-dimethylimidazolidine-2,4-dione, iodopropynyl butylcarbamate, and mixtures thereof.

3. The composition of claim 1, wherein the sugar alcohol is sorbitol.

4. The composition of claim 1, wherein the hydrolyzed animal protein is TEA-coco-hydrolyzed animal protein.

5. The composition of claim 1, wherein the sarcosine compound is cocoyl sarcosine.

6. The composition of claim 1, wherein the water comprises more than 50 weight % of the composition.

7. The composition of claim 1, wherein the polyethylene comprises from 10 to 30 weight % of the composition.

8. The composition of claim 1, wherein the surfactant comprises from 0.5 to 10 weight % of the composition.

9. The composition of claim 1, wherein the preservative comprises from 0.01 to 3 weight % of the composition.

10. The composition of claim 1, wherein the preformed mixture comprises from 1 to 20 weight % of the composition.

11. The composition of claim 1, wherein the preformed mixture is prepared from 40 to 60 weight % of sugar alcohol, from 25 to 45 weight % of hydrolyzed animal protein, and from 1 to 20 weight % of sarcosine compound.

12. The composition of claim 1, wherein the composition has a pH of 7.0 or greater.

13. A textile material treated with the composition of claim 1.

14. The treated textile material of claim 13, wherein the textile material is nylon.

15. A method of preparing a composition for treating a textile material comprising:
    (a) mixing a mixture of components consisting of at least one sugar alcohol, at least one hydrolyzed animal protein, and at least one sarcosine compound to form a preformed mixture;
    (b) adjusting pH of the preformed mixture to a pH of 6.0 or greater;
    (c) mixing water, a surfactant, a preservative, and the preformed mixture to form a solution;
    (d) adjusting pH of the solution to a pH of 6.5 or greater; and
    (e) adding polyethylene to the solution,
    wherein the surfactant is selected from the group consisting of disodium lauryl sulfosuccinate, cetrimonium chloride, and a mixture of disodium lauryl sulfosuccinate and cetrimonium chloride.

16. The method of claim 15, further comprising adding a fragrance to the solution in step (e).

17. The method of claim 15, further comprising filtering the solution after step (e).

18. The method of claim 15, wherein the temperature of the solution is maintained at 15° C. to 40° C. during preparation of the composition.

19. The composition of claim 1, wherein the component for adjusting pH is selected from the group consisting of triethanolamine, ammonia, diethanolamine, monoethanolamine, potassium hydroxide, sodium hydroxide, caustic soda, and mixtures thereof.

20. A lacrosse stick comprising a pocket, wherein the pocket comprises a textile material coated with the coating composition according to claim 1.

* * * * *